United States Patent [19]

Hodge

[11] 3,904,626

[45] Sept. 9, 1975

[54] SUBSTITUTED TRIAZABICYCLONONANES

[75] Inventor: Edward B. Hodge, Terre Haute, Ind.

[73] Assignee: Commercial Solvents Corporation, Terre Haute, Ind.

[22] Filed: Aug. 23, 1974

[21] Appl. No.: 499,872

Related U.S. Application Data

[63] Continuation-in-part of Ser. No. 141,973, May 10, 1971, abandoned.

[52] U.S. Cl............260/256.4 H; 260/256.4 F; 260/256.4 H; 424/251

[51] Int. Cl.$^2$...................... C07D 239/04

[58] Field of Search.... 260/256.4 H, 256.4 F, 256.4 N

[56] References Cited
UNITED STATES PATENTS

| | | | |
|---|---|---|---|
| 2,677,927 | 5/1954 | Wright et al................ | 260/248 |
| 2,680,671 | 6/1954 | Bachmann.................. | 260/248 X |
| 2,686,804 | 8/1954 | Cason....................... | 260/248 X |
| 3,133,054 | 5/1964 | Wright et al................ | 260/248 X |

Primary Examiner—Richard J. Gallagher
Assistant Examiner—James H. Turnipseed
Attorney, Agent, or Firm—Robert H. Dewey; Howard E. Post

[57] ABSTRACT 1,3,7-Triazabicyclo-[3.3.1]nonanes are prepared by reacting 7-nitro-1,3,5-triazaadamantane or 1,3,5-triazaadamantylamine with a monocarboxylic acid anhydride. Derivatives are obtained by reactions at the nitro radical. The compounds have utility in a variety of applications.

20 Claims, No Drawings

SUBSTITUTED TRIAZABICYCLONONANES

CROSS-REFERENCE TO RELATED APPLICATIONS

This application is a continuation-in-part of U.S. Ser. No. 141,973, filed May 10, 1971, now abandoned.

BACKGROUND OF THE INVENTION

This invention relates to substituted triazabicyclononanes and derivatives thereof. In a particular aspect this invention relates to compounds corresponding to formula II below.

Heterocyclic, nitrogen-containing compounds are well known in the art. However, it is believed that the triazabicyclic nonanes of the present invention represent a novel class of compounds previously unreported in the art. The compounds of the present invention are believed novel.

SUMMARY OF THE INVENTION

It is an object of this invention to provide substituted triazabicyclononanes.

It is yet another object of this invention to provide compounds corresponding to formula II below.

Other objects of this invention will be apparent to those skilled in the art from the disclosure herein.

It is the discovery of this invention that compounds corresponding to formula I below react with aromatic or aliphatic monocarboxylic acid anhydrides to provide cyclic compounds corresponding to formula II below.

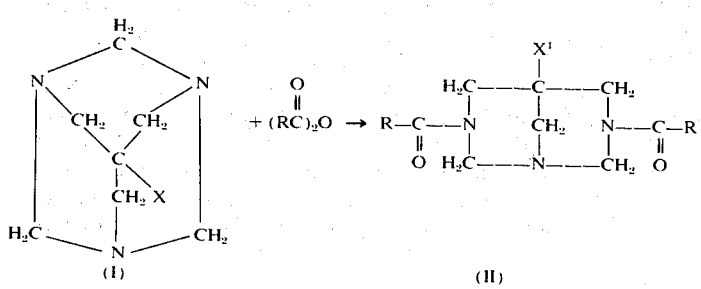

In the above formulas, X is nitro or amino; $X^1$ can be nitro, hydroxylamino, amino, or

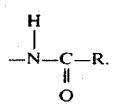

R is alkyl or aryl.

The reaction is effected by reacting a compound corresponding to formula I with an aliphatic or aromatic monocarboxylic acid anhydride at elevated temperatures for a period of time sufficient to cause the release of formaldehyde thereby providing a product corresponding to formula II. When $X^1$ is nitro, the nitro compound is then hydrogenated, either partially to provide a compound wherein $X^1$ is hydroxylamino, or wholly wherein $X^1$ is amino. When X is $-NH_2$, then $X^1$ is

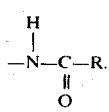

The compounds II are solids and are recovered by crystallization from organic solvents, e.g. acetone.

The compounds disclosed herein have utility in a variety of applications. For example, when $X^1$ is

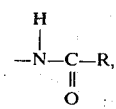

the compounds are useful as blending agents to prevent phase separation of a liquid epoxy resin in alcohol when used in a proportion of about 5% based on the weight of the alcohol. When $X^1$ is amino, the compound is useful as a catalyst for preparing a polyurethane resin from an isocyanate monomer when used at a proportion of about 1% based on the monomer. When $X^1$ is hydroxylamino, the compound is useful for inhibiting the growth of micro-organisms susceptible thereto, e.g. Aspergillus fumigatis and Pasteurella pseudotuberculosis, using methods of application known in the art, e.g. as described by H. L. Wehrmeister, U.S. Pat. No. 3,509,260. When $X^1$ is nitro, the compound is useful as a raw material for preparation of the hydroxylamino or the amino derivative.

DETAILED DISCUSSION

According to the present invention, a compound corresponding to formula I is reacted with a monocarboxylic anhydride in about a 1:2-10 mole ratio at elevated temperatures of about 80°–100°C to provide compounds corresponding to formula II with the release of 1 to 2 moles of formaldehyde. Although theoretically a 1:2 mole ratio of I to acid anhydride is sufficient when X is nitro, a 1:3 ratio is required when X is $-NH_2$. However, it is preferable to employ an excess of anhydride to insure complete reaction. Accordingly, the preferred mole ratio is about 1:5–10.

Compounds corresponding to formula I include 7-nitro-1,3,4-triazaadamantane or 1,3,5-triaza-7-adamantylamine. The preparation of 7-nitro-1,3,5-triazaadamantane, and the corresponding amino derivative was disclosed by N. W. Gabel, U.S. Pat. No. 3,301,854, which is incorporated herein by reference thereto. This method is suitable for preparing the triazaadamantanes useful in the present invention.

The acid anhydrides useful in the practice of this invention include any aliphatic or aromatic monocarboxylic acid anhydride. The preferred anhydrides include but are not limited to the lower aliphatic anhydrides, e.g. acetic and propionic anhydrides, and benzoic anhydride. These compounds are common articles of commerce and the usual commercial materials are suitable for the practice of this invention. Accordingly, R in the preferred compounds is methyl, ethyl or phenyl.

The reaction period required to produce the nitro and amido compounds of the present invention varies with the temperature. Generally about half an hour is sufficient at a temperature of 90°–100°C. After the reaction is determined to be complete, the excess anhydride is hydrolyzed by the addition of a plentiful excess of water. The product is recovered by any convenient method. One suitable method is to evaporate the solution under reduced pressure and recrystallize the product from a lower alkanol, e.g. methanol, ethanol, or, preferably, isopropyl alcohol.

The amino and the hydroxylamino compounds of the present invention are conveniently prepared by hydrogenation of the nitro derivatives. The hydrogenation techniques employed are those known in the art. Thus hydrogenation at ambient temperatures under elevated pressure in the presence of finely divided nickel catalyst ("Raney" nickel) produces the amino compound. Hydrogenation of the nitro compound at ambient temperatures and elevated pressures in the presence of palladium catalyst produces the hydroxylamino compound in good yield.

The invention will be better understood with reference to the following examples. It is understood however that the examples are intended for illustration only and it is not intended that the invention be limited thereby.

EXAMPLE 1

7-Nitro-1,3,5-triazaadamantane, 3.0 g(0.016 mole), was mixed with 10 ml (0.106 mole) acetic anhydride and heated on a steam bath 30 minutes. Water, 100 ml, was added to hydrolyze excess anhydride and the solution was then evaporated to dryness under reduced pressure. The residue was crystallized from 40 ml of isopropyl alcohol. There was obtained 3,7-diacetyl-5-nitro-1,3,7-triazabicyclo[3.3.1]nonane, 2.0 g, m.p. 158°–161°C.

| Analysis | Calc. | Found |
|---|---|---|
| % C | 46.87 | 46.92 |
| % H | 6.29 | 6.57 |

The infra-red spectrum was consistent with the proposed structure. The nitro compound is useful for preparing the amino derivative of example 3 and the hydroxylamino derivative of example 4.

EXAMPLE 2

The experiment of example 1 was repeated in all essential details except that 1,3,5-triaza-7-adamantylamine was substituted for the nitro compound. The residue was crystallized from 50 ml of acetone, then from 25 ml of isopropyl alcohol. There was obtained 0.7 g of 5-acetamido-3,7-diacetyl-1,3,7-triazabicyclo[3.3.1]nonane, m.p. 232°–236°C. The analysis for C, H and N yielded results in agreement with the proposed structure.

This compound is useful to prevent phase separation of a solution of a liquid epoxy resin in alcohol. A 50% by weight solution of an epoxy resin in anhydrous ethyl alcohol was prepared. The resin used was a condensation product obtained from epichlorohydrin and bis-phenol-A having an epoxy assay of 185–195 g per gram mol. of oxirane (the resin designated ERL-2774, manufactured by Union Carbide Corporation, was used). The solution was divided into 2 portions. To one portion there is added 5%, based on the weight of the alcohol, of the product obtained in the foregoing experiment. The other portion was used as a control. It became cloudy in a few hours and by the next day it had separated into two phases which could not be readily redissolved. The portion containing the additive does not separate.

EXAMPLE 3

A 10 g sample of the product prepared in accordance with example 1 was dissolved in 150 ml of methanol and placed in a pressure vessel. There was added about 5 g of a suspension of finely divided nickel (Raney nickel) in water. The vessel was closed and pressurized with hydrogen to 50 psig. Agitation was provided and the pressure was maintained constant for about 4 hours at ambient temperatures. The pressure was then vented and the nickel separated by filtration. The filtrate was allowed to evaporate and the residue was dissolved in a mixture of 25 ml acetone and 10 ml methanol. This solution was concentrated to 15 ml, then diluted with 50 ml acetone and again concentrated to 15 ml. It was cooled and filtered to yield 4.4 g of 5-amino-3,7-diacetyl-1,3,7-triazabicyclo[3.3.1] nonane, mp. 180°–182°C. The analysis for C, H and N yielded results consistent with the proposed structure.

This compound was used as a catalyst for preparing a polyurethane resin. The solution of isocyanate monomer used was a moisture-curing polyurethane resin having from 6.9–7.9% of available isocyanate groups. The material used was designated Arothane 171-XA1-42, manufactured by the Ashland Chemical Company. To a portion of this monomer was added 1% by weight of the compound prepared in the foregoing experiment. The viscosity gradually increased until a gel was obtained. Another portion free from the catalyst remained fluid and stable.

EXAMPLE 4

A 25 g sample of the product prepared in accordance with example 1 was dissolved in 600 ml of water and placed in a pressure vessel. There was added 1.0 g of 5% palladium on char. The vessel was closed, pressurized with hydrogen to about 1000 psig. Agitation was provided and the pressure was maintained for about 4 hours at ambient temperature.

At the end of the reaction period, the pressure was vented, the contents of the vessel was filtered and the precipitate was extracted with 150 ml of warm methanol. The washings were filtered to remove catalyst and concentrated by evaporation to 50 ml. The solution was cooled overnight and there was obtained 15.5 g of crude 5-hydroxylamino-3,7-diacetyl-1,3,7-triazabicyclo[3.3.1]nonane, m.p. 190°–197°C. The crude was receystallized twice from a mixture of 100 ml of ethanol plus 50 ml methanol to yield 9.9 g of product, m.p. 201°–205°C. The analysis for C, H and N was consistent with the proposed structure.

This compound inhibited the growth of Aspergillus fumigatis and Pasteurella pseudotuberculosis at concentrations of 500–1000 μg/ml. The compound is employed to combat these organisms by applying it to their habitat, e.g. following the methods disclosed by H.

L. Wehrmeister in U.S. Pat. No. 3,509,260, which is incorporated herein by reference thereto.

EXAMPLE 5

The experiment of example 1 was repeated in all essential details except that propionic anhydride was substituted for acetic anhydride. There was obtained 5-nitro-3,7-dipropionyl-1,3,7-triazabicyclo[3.3.1]nonane, m.p. 145°–147°C. It had the following analysis:

|  | Carbon | Hydrogen |
|---|---|---|
| Found, % | 50.89 | 7.12 |
| Calculated, % | 50.69 | 7.09 |

The compound prepared above is used to prepare the corresponding amino compound of example 7 and the corresponding hydroxylamino compound of example 9.

EXAMPLE 6

7-Nitro-1,3,5-triazaadamantane, 9.2 g, and benzoic anhydride, 19.6 g, were mixed and heated for 4 hours on a steam bath, after which there was added to the reaction mixture 50 ml of hot isopropyl alcohol and the mixture was filtered. The filtrate was diluted with 40 ml of water, allowed to cool overnight and the resulting crystals, 8.2 g, m.p. 160°–189°C were filtered. The crystals were dissolved in a mixture of 200 ml of water and 500 ml of isopropyl alcohol, concentrated by evaporation to 300 ml, cooled and filtered. There was obtained 3,7-dibenzoyl-5-nitro-1,3,7-triazabicyclo[3.3.1]nonane, m.p. 239°–240°C. It had the following analysis:

|  | Carbon | Hydrogen |
|---|---|---|
| Found, % | 62.95 | 5.53 |
| Calculated, % | 63.15 | 5.30 |

The compound prepared above is used to prepare the corresponding amino compound of example 8 and the corresponding hydroxylamino compound of example 10.

EXAMPLES 7 and 8

The experiment of example 3 is repeated in all essential details except that the product of example 5 is reduced to the amino compound (example 7) and the product of example 6 is reduced to the amino compound (example 8). These amino compounds are useful as cross-linking agents for curing polyurethane resins as described in example 3.

EXAMPLES 9 and 10

The experiment of example 4 is repeated in all essential details except that the product of example 5 is reduced to the hydroxylamino derivative (example 9) and the product of example 6 is reduced to the hydroxylamino derivative (example 10). These hydroxylamino compounds are useful for combatting the growth of A. fumigatis and Pasteurella pseudotuberculosis as described in example 4.

EXAMPLES 11 and 12

The experiment of example 2 is repeated in all essential details except that, in example 11, propionic anhydride is substituted for acetic anhydride and the propionyl derivative is obtained. In example 12, benzoic anhydride is substituted for acetic anhydride and the benzyl derivative is obtained. The compounds of examples 11 and 12 are useful to prevent phase separation of a solution of a liquid epoxy resin in alcohol as described in example 2.

I claim:

1. A compound of the formula

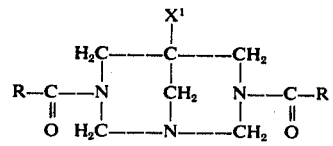

wherein $X^1$ is nitro, hydroxylamino, amino, or

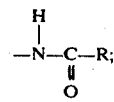

R is methyl, ethyl or phenyl.

2. A compound of claim 1 wherein $X^1$ is nitro.
3. A compound of claim 1 wherein $X^1$ is hydroxylamino.
4. A compound of claim 1 wherein $X^1$ is amino.
5. A compound of claim 1 wherein $X^1$ is

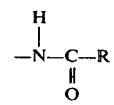

6. A compound of claim 1 wherein R is methyl.
7. A compound of claim 1 wherein R is ethyl.
8. A compound of claim 1 wherein R is phenyl.
9. A method for the preparation of a compound of claim 1 by reacting a compound corresponding to the formula

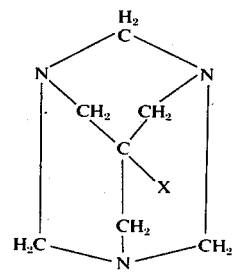

wherein X is nitro or amino with acetic, propionic or benzoic acid anhydride in a mole ratio of about 1:2–10 at a temperature of about 90°–100°C; when X is nitro, $X^1$ is nitro and when X is amino, $X^1$ is

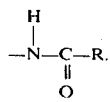

10. The method of claim 9 wherein X is nitro.

11. The method of claim 9 wherein X is amino.
12. The method of claim 9 wherein said acid anhydride is acetic anhydride.
13. The method of claim 9 wherein said acid anhydride is propionic anhydride.
14. The method of claim 9 wherein said acid anhydride is benzoic anhydride.
15. 3,7-Diacetyl-5-nitro-1,3,7-triazabicyclo[3.3.1]nonane.
16. 5-Acetamido-3,7-diacetyl-1,3,7-triazabicyclo[3.3.1]nonane.
17. 5-Amino-3,7-diacetyl-1,3,7-triazabicyclo[3.3.1]nonane.
18. 5-Hydroxylamino-3,7-diacetyl-1,3,7-triazabicyclo[3.3.1]nonane.
19. 5-Nitro-3,7-dipropionyl-1,3,7-triazabicyclo[3.3.1]nonane.
20. 3,7-Dibenzoyl-5-nitro-1,3,7-triazabicyclo[3.3.1]nonane.

* * * * *